US011791872B2

(12) United States Patent
Luo et al.

(10) Patent No.: US 11,791,872 B2
(45) Date of Patent: Oct. 17, 2023

(54) AUTOCORRELATION AND MEMORY ALLOCATION FOR WIRELESS COMMUNICATION

(71) Applicant: MICRON TECHNOLOGY, INC., Boise, ID (US)

(72) Inventors: Fa-Long Luo, San Jose, CA (US); Tamara Schmitz, Scotts Valley, CA (US); Jeremy Chritz, Seattle, WA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/453,914

(22) Filed: Nov. 8, 2021

(65) Prior Publication Data
US 2022/0060226 A1    Feb. 24, 2022

Related U.S. Application Data

(63) Continuation of application No. 16/844,178, filed on Apr. 9, 2020, now Pat. No. 11,201,646, which is a
(Continued)

(51) Int. Cl.
*H04B 7/0456* (2017.01)
*H04B 7/08* (2006.01)
(Continued)

(52) U.S. Cl.
CPC ........... *H04B 7/0456* (2013.01); *G06F 17/15* (2013.01); *G06F 17/153* (2013.01);
(Continued)

(58) Field of Classification Search
CPC ...... H04B 7/0456; H04B 7/0413; H04B 7/08; H04B 7/0837
(Continued)

(56) References Cited

U.S. PATENT DOCUMENTS 5,999,800 A    12/1999   Choi et al.
6,285,861 B1   9/2001    Bonaccorso et al.
(Continued)

FOREIGN PATENT DOCUMENTS

WO    0038276 A1    6/2000
WO    2019079124    4/2019

OTHER PUBLICATIONS

U.S. Appl. No. 16/844,178 titled "Autocorrelation and Memory Allocation for Wireless Communication" filed Apr. 9, 2020, pp. all.
(Continued)

*Primary Examiner* — Sam K Ahn
*Assistant Examiner* — Gina M McKie
(74) *Attorney, Agent, or Firm* — Dorsey & Whitney LLP

(57) ABSTRACT

Examples described herein include systems and methods which include wireless devices and systems with examples of an autocorrelation calculator. An electronic device including an autocorrelation calculator may be configured to calculate an autocorrelation matrix including an autocorrelation of symbols indicative of a first narrowband Internet of Things (IoT) transmission and a second narrowband IoT transmission. The electronic device may calculate the autocorrelation matrix based on a stored autocorrelation matrix and the autocorrelation of symbols indicative of the first narrowband IoT transmission and symbols indicative of the second narrowband IoT transmission. The stored autocorrelation matrix may represent another received signal at a different time period than a time period of the first and second narrowband IoT transmission. Examples of the systems and methods may facilitate the processing of data for wireless and may utilize less memory space than a device than a scheme that stores and calculates autocorrelation from a large dataset computed from various time points.

20 Claims, 8 Drawing Sheets

Related U.S. Application Data continuation of application No. 16/116,878, filed on Aug. 29, 2018, now Pat. No. 10,651,903, which is a continuation of application No. 15/789,600, filed on Oct. 20, 2017, now Pat. No. 10,305,555.

(51) Int. Cl.
*G06F 17/15* (2006.01)
*H04B 7/0413* (2017.01)
*H04W 84/00* (2009.01)

(52) U.S. Cl.
CPC ............ *H04B 7/0413* (2013.01); *H04B 7/08* (2013.01); *H04W 84/005* (2013.01)

(58) Field of Classification Search
USPC ......................................................... 375/267
See application file for complete search history.

(56) References Cited

U.S. PATENT DOCUMENTS

| | | | |
|---|---|---|---|
| 7,103,101 | B1 | 9/2006 | Davila |
| 7,236,538 | B1 | 6/2007 | Banister |
| 8,199,841 | B1 | 6/2012 | Sarrigeorgidis et al. |
| 8,953,719 | B2 | 2/2015 | Ozaki |
| 10,305,555 | B2 | 5/2019 | Luo et al. |
| 10,651,903 | B2 | 5/2020 | Luo et al. |
| 11,201,646 | B2 | 12/2021 | Luo et al. |
| 2003/0031234 | A1* | 2/2003 | Smee ................... H04B 7/0848 375/147 |
| 2003/0135816 | A1 | 7/2003 | Kim et al. |
| 2007/0117527 | A1* | 5/2007 | Xu ....................... H04B 7/0857 455/127.4 |
| 2007/0195900 | A1 | 8/2007 | Lee et al. |
| 2008/0095259 | A1 | 4/2008 | Dyer et al. |
| 2008/0170554 | A1 | 7/2008 | Wang et al. |
| 2009/0135944 | A1 | 5/2009 | Dyer et al. |
| 2009/0239472 | A1 | 9/2009 | Chae et al. |
| 2014/0056393 | A1 | 2/2014 | Xu |
| 2015/0171949 | A1 | 6/2015 | Choi et al. |
| 2015/0236872 | A1 | 8/2015 | Xiong et al. |
| 2016/0110166 | A1* | 4/2016 | Moschopoulos ....... G06F 7/588 708/250 |
| 2016/0192138 | A1* | 6/2016 | Amizur ................. H04W 4/023 455/456.1 |
| 2017/0093465 | A1 | 3/2017 | Molev Shteiman et al. |
| 2017/0243602 | A1* | 8/2017 | Yang ....................... G10L 25/21 |
| 2018/0076858 | A1 | 3/2018 | Wu |
| 2019/0123791 | A1 | 4/2019 | Luo et al. |
| 2019/0123793 | A1 | 4/2019 | Luo et al. |
| 2020/0235794 | A1 | 7/2020 | Luo et al. |

OTHER PUBLICATIONS

English translation of Office Action for KR Application No. 10-2020-7014029, dated Feb. 5, 2021, pp. all.

Extended European Search Report for EP Application No. 18869154.7, dated Jun. 15, 2021, pp. all.

International Search Report and Written Opinion of the International Searching Authority for PCT Application No. PCT/US2018/055662 dated Jan. 28, 2019, pp. all.

IPRP dated Apr. 30, 2020 for PCT Application No. PCT/US2018/055662, 6 pgs.

PCT Application No. PCT/US18/55662 titled "Autocorrelation and Memory Allocation for Wireless Communication" filed Oct. 12, 2018, pp. all.

U.S. Appl. No. 15/789,600, entitled "Autocorrelation and Memory Allocation for Wireless Communication", filed Oct. 20, 2017, pp. all.

U.S. Appl. No. 16/116,878 titled "Autocorrelation and Memory Allocation for Wireless Communication" filed Aug. 29, 2018, pp. all.

* cited by examiner

AUTOCORRELATION AND MEMORY ALLOCATION FOR WIRELESS COMMUNICATION

CROSS REFERENCE TO RELATED APPLICATION(S)

This application is a continuation of U.S. patent application Ser. No. 16/844,178 filed Apr. 9, 2020 and issued as U.S. Pat. No. 11,201,646 on Dec. 14, 2021, which is a continuation of U.S. patent application Ser. No. 16/116,878 filed Aug. 29, 2018 and issued as U.S. Pat. No. 10,651,903 on May 12, 2020, which is a continuation of U.S. patent application Ser. No. 15/789,600 filed Oct. 20, 2017 and issued as U.S. Pat. No. 10,305,555 on May 28, 2019. The aforementioned applications, and issued patents, are incorporated herein by reference, in its entirety, for any purpose.

BACKGROUND

There is interest in moving wireless communications to "fifth generation" (5G) systems. 5G promises increased speed and ubiquity, but methodologies for processing 5G wireless communications have not yet been set. Implementing 5G systems may require more efficient use of the wireless spectra and memory consumption utilized in implementing such 5G systems.

Example 5G systems may be implemented using multiple-input multiple-output (MIMO) techniques, including "massive MIMO" techniques, in which multiple antennas (more than a certain number, such as 8 in the case of example MIMO systems) are utilized for transmission and/or receipt of wireless communication signals.

DETAILED DESCRIPTION

Figure 1:
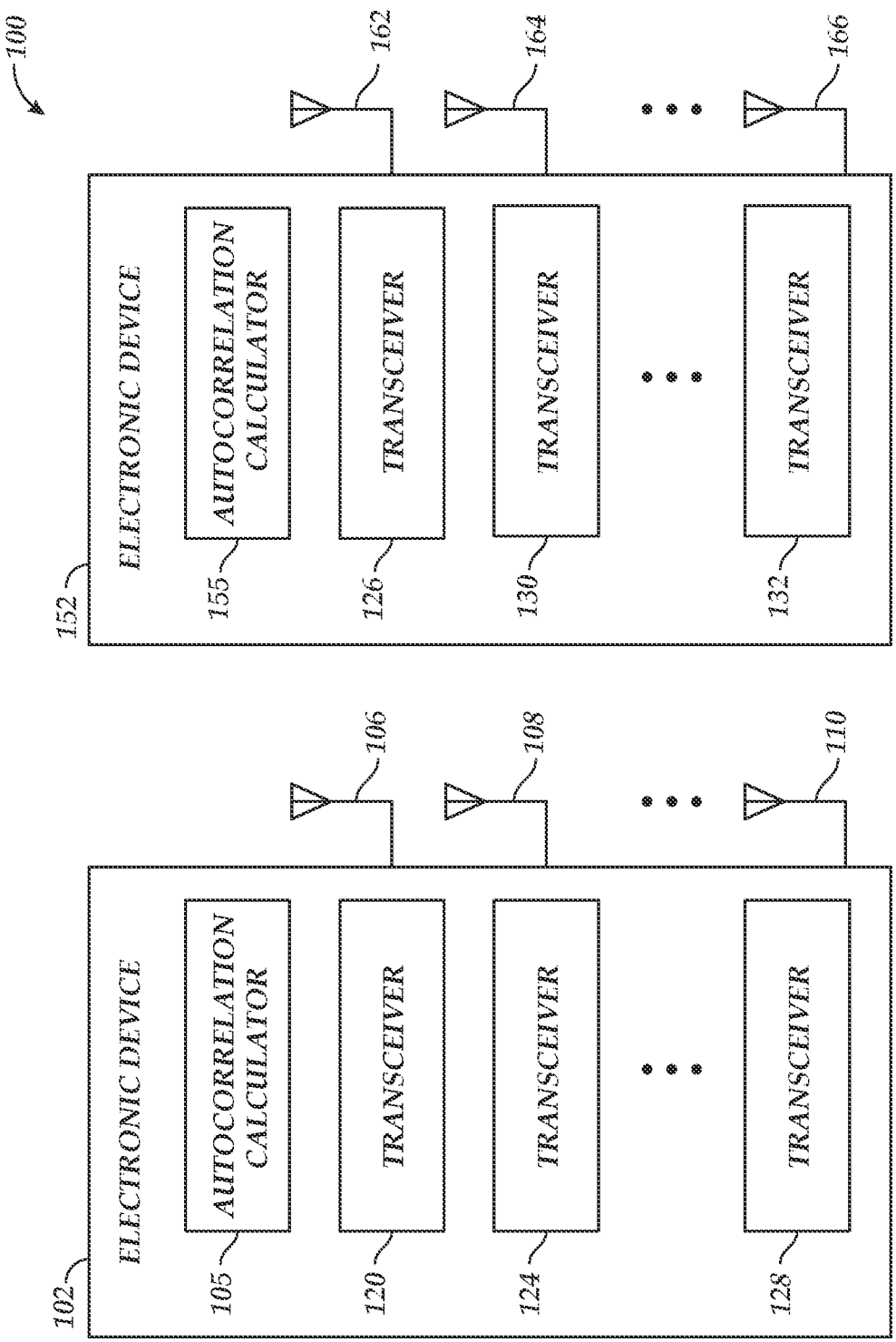
FIG. 1 is a block diagram of a wireless communications system arranged in accordance with examples described herein.

Traditional schemes to calculate an autocorrelation rely on large data sets to be computed from various time periods to calculate an accurate autocorrelation. Such processing may require cumbersome memory access schemes to retrieve each relevant dataset for an overall calculation. In addition, memory storage is utilized to store such datasets in anticipation of such a calculation, requiring an increasingly larger memory footprint on devices that are an increasing in demand to be miniaturized. For example, an increasing demand for "Internet of Things" (IoT) devices may include miniaturization, while simultaneously include demand for faster signal processing techniques.

The systems and methods described herein can be utilized to calculate an autocorrelation of a given signal using a dataset for a specific time period. Advantageously, this may allow the autocorrelation to be calculated faster than conventional techniques and utilizing less memory (e.g., Flash or RAM) than conventional techniques that may wait to receive several signals over multiple time periods. In an example, the autocorrelation of a specific time period is calculated and stored, and then used again in a subsequent calculation of a next dataset with another specific time period. By storing a value for each time period of the autocorrelation, less memory may be utilized than conventional schemes that may utilize memory storage for information received during each time period.

Examples described herein include systems and methods which include wireless devices and systems with autocorrelation calculators which may utilize an autocorrelation between multiple wireless channels to generate an autocorrelation matrix. Such an autocorrelation matrix may be updated at each time period to incorporate an autocorrelation matrix of a received signal at each respective time period. An autocorrelation matrix of each received signal may be added to such a cumulative autocorrelation matrix that may represent an overall autocorrelation of the received signals after multiple time periods.

In some examples, an autocorrelation calculator may be included in an electronic device that includes multiple antennas. Receivers, transmitters, and/or transceivers described herein may receive the incident RF energy response to the indication that the wireless communication is present in the portion of the wireless spectrum, and generate symbols that are autocorrelated in autocorrelation calculator. Radio frequency (RF) energy may be incident on multiple antennas (e.g. a first and second antenna). The autocorrelation calculator may perform an autocorrelation calculation between symbols indicative of the RF energy received on the first and second antennas in a portion of the wireless spectrum (e.g. at a particular frequency and/or frequency band) and combine or incorporate (e.g., add) the result to a stored autocorrelation matrix. The RF energy received on the first and second antenna in a portion of the wireless spectrum may be referred to as RF signals from each antenna. The autocorrelation calculator may provide an updated autocorrelation matrix that represents the stored autocorrelation matrix and the calculated autocorrelation matrix according to the symbols indicative of the RF energy received on the first and second antennas.

By using information from massive multi-input and multi-output (MIMO) systems described herein (which may be utilized in 5G wireless systems), examples described herein may utilize an autocorrelation between different MIMO transmission channels to calculate an autocorrelation matrix for a specific time period. For example, such a calculated autocorrelation may be utilized to calculate a set of weights to apply to incoming signals of a MIMO transceiver. In determining such weights with a calculated autocorrelation, a MIMO system may utilize the set of weights to more efficiently process, including at higher processed speeds, incoming signals, with the weights compensating the incoming signals in real-time. Such compensated signals may be further processed by the MIMO transceiver in accordance with any wireless application, such as beamforming applications, full-duplex applications, digital RF processing, and additional MIMO applications. In various examples, calculated autocorrelations may be utilized directly in such applications.

In an example of such an autocorrelation calculation to determine a set of weights for the calibration of a transceiver, the autocorrelation, R(N), of a known calibration signal, Y(N), may be utilized in a signal processing scheme to calculate the weights that relate the received signal, X(N). X(N) may be a representation of the calibration signal, Y(N), at a transceiver, such as a MIMO transceiver including a MIMO antenna array. For example, X(N) may be an estimation of the calibration signal, Y(N) as received by a transceiver that may include wireless channel effects and noise from the transceiver. The received signal, X(N), may be represented as:

$$X(N) = \begin{pmatrix} x_1(1), & x_2(1), & & x_L(1) \\ x_1(2), & x_2(2), & & x_L(2) \\ \vdots & \vdots & \ldots & \vdots \\ x_1(N), & x_2(N), & & x_L(N) \end{pmatrix}$$

Each component, $x_L$, of the received signal may be received at an individual antenna, of which L antennas may receive the received signal, X(N). For example, each individual antenna may be a different antenna of a MIMO antenna array. N samples of each component of the received signal may be received over a time period of N length. For example, N length may be a time length, such as 10 ns, 10 ms, or 1 sec. The calibration signal, Y(N), can be referred to as a calibration signal matrix and may be represented as:

$$Y(N) = \begin{pmatrix} y(1) \\ y(2) \\ \vdots \\ \vdots \\ y(N) \end{pmatrix}$$

The autocorrelation, R(N), of the received signal may be computed via matrix multiplication, which may be represented as:

$$R(N) = X^T(N)X(N) = \begin{pmatrix} r_1(1), & r_2(1), & & r_L(1) \\ r_1(2), & r_2(2), & & r_L(2) \\ \vdots & \vdots & \ldots & \vdots \\ r_1(L), & r(L), & & r_L(L) \end{pmatrix}$$

In accordance with signal processing techniques described herein, a set of weights may be determined by matrix multiplication of the inverse autocorrelation matrix, $R^{-1}(N)$ and a matrix, B(N), that represents the matrix multiplication of the transpose matrix of the received signal, $X^T(N)$ and the calibration signal, Y(N). For example, the set of weights may be determined in accordance with the following equation:

$$W = R^{-1}(N)B(N), \text{ where } W = \begin{pmatrix} w_1 \\ w_2 \\ \vdots \\ \vdots \\ w_L \end{pmatrix} \text{ and } B(N) = X^T(N)Y(N) = \begin{pmatrix} b_1(N) \\ b_2(N) \\ \vdots \\ b_L(N) \end{pmatrix}$$

As described herein, examples of an autocorrelation calculation to determine a set of weights for the calibration of a transceiver may include a calculation of the autocorrelation, R(N). In an example autocorrelation calculation, the matrix R(N) may be computed in real-time (e.g., as signals are received), with an updated autocorrelation matrix being computed for each time period of a received signal. This may include receiving, from each antenna of a plurality of antennas, respective RF energies of a received signal at a time period. For example, the received signal may be represented as a vector at time period N, with each L antenna receiving a component of the received signal:

$$\begin{pmatrix} x_1(N) \\ x_2(N) \\ \vdots \\ x_L(N) \end{pmatrix}$$

Each component of the vector may represent a symbol(s) indicative of RF energy received at each respective antenna. An autocorrelation matrix may be calculated on the basis of autocorrelation such symbols and adding that autocorrelated matrix to a stored autocorrelation matrix. For example, the stored autocorrelation matrix may represent an autocorrelation of one or more received signals over various time periods. At a time period 0, the stored autocorrelation matrix may be a zero matrix of size L×L, where L is a number of antennas. To perform a calculation utilizing the stored autocorrelation matrix, an autocorrelation calculation may be represented as:

$$R(N) = R(N-1) + \begin{pmatrix} x_1(N) \\ x_2(N) \\ \vdots \\ x_L(N) \end{pmatrix}(x_1(N), x_2(N), \ldots x_L(N))$$

As an example, at a first time period (e.g., N=1), the autocorrelation may be calculated as:

$$R(1) = R(0) + \begin{pmatrix} x_1(1) \\ x_2(1) \\ \vdots \\ x_L(1) \end{pmatrix}(x_1(1), x_2(1), \ldots x_L(1))$$

Accordingly, a stored autocorrelation matrix, R(0), may be retrieved from memory and added in matrix form to the autocorrelation of the symbols indicative of RF energy received at each respective antenna at that first time period. Advantageously, with the stored autocorrelation matrix, R(0), occupying an L×L size of memory and with the vector representative of the symbols indicative of RF energy received at each respective antenna at that first time period occupying L size of memory, the amount of memory occupied in this autocorrelation calculation may be less than that of memory occupied when an autocorrelation is not computed at each time period.

For example, according to an autocorrelation calculation described above where a signal or signals are received during N time periods for each L antenna, the autocorrelation matrix may occupy an N×L amount of memory. Such an autocorrelation calculation may utilize more memory in calculating the autocorrelation than the autocorrelation calculation, described herein, in which each received signal vector in real-time is autocorrelated and added to a stored autocorrelation matrix representative of the autocorrelation at a previous time period relative to a current, real-time, time period of the received signal. In an example of such a memory comparison, the autocorrelation calculation utilizing N×L amount of memory may represent a number of samples corresponding to 4000 (e.g., N=4000) and a number of antennas corresponding to 16 (e.g., L=16), thereby occupying a 64 k wordspace size of memory (e.g., 4000*16=64000). In contrast, the autocorrelation calculation utilizing a stored autocorrelation matrix may represent a real-time calculation for a number of antennas corresponding to 16, thereby occupying a 272 wordspace size of memory (e.g., 16*16+16). That is, the stored autocorrelation matrix may occupy an L×L size of memory (e.g., 16*16) and the received signal vector in real-time may occupy an L size of memory (e.g., 16). Accordingly, the autocorrelation calculation utilizing the stored autocorrelation matrix may utilize a lesser amount of memory (e.g., fewer cells, a smaller portion of an array, a smaller page size, a smaller word size, or the like) than the autocorrelation calculation occupying an N×L amount of memory.

As described herein, a stored autocorrelation matrix may represent the autocorrelation of previous received signals at previous time periods. Accordingly, R(1), may be representative of the symbols indicative of RF energy received at each respective antenna at that first time period and a zero time period; and R(2), the symbols indicative of RF energy received at each respective antenna at the zero time period, the first time period, and the second time period. In accordance with the autocorrelation calculation described herein, R(2) may be calculated as:

$$R(2) = R(1) + \begin{pmatrix} x_1(2) \\ x_2(2) \\ \vdots \\ x_L(2) \end{pmatrix} (x_1(2), x_2(2), \ldots x_L(2))$$

In various examples, the autocorrelation matrix that was stored may be updated after the addition of the stored autocorrelation matrix to the autocorrelation of the real-time vector. For example, the updated autocorrelation matrix may be stored in the same memory space as that from which the stored autocorrelation matrix was retrieved, thereby occupying the same memory space while additional updated autocorrelation matrices continue to be calculated. Each calculated autocorrelation matrix may be referred to as a version of the autocorrelation, such that, for each time period, symbols indicative of the respective RF energies may be autocorrelated, and combined with a respective version of the autocorrelation matrix. For example, the respective version may be the stored autocorrelation matrix at each previous time period relative to the time period in which the calculation occurs. Accordingly, the autocorrelation calculation described herein may continue to be computed in real-time, for example in the same memory space, with a calculation at time period N calculated as:

$$R(N) = R(N-1) + \begin{pmatrix} x_1(N) \\ x_2(N) \\ \vdots \\ x_L(N) \end{pmatrix} (x_1(N), x_2(N), \ldots x_L(N))$$

Advantageously, in computing each version of the autocorrelation matrix and determining an overall autocorrelation matrix, a calculated autocorrelation may be used in various applications for a wireless transceiver, such as for the determination of a set of weights for incoming signals. Accordingly, a transceiver may receive continuously an incoming signal over multiple time periods at a plurality of antennas. The calculated autocorrelation matrix may be utilized with a calibration signal to determine a set of weights, which may be utilized to generate an estimate of the information encoded in additional incoming signals based on the determined set of weights.

The benefits and various solutions introduced above are further described below with reference to exemplary systems, apparatus, and methods.

FIG. 1 is a block diagram of a wireless communications system arranged in accordance with examples described herein. System 100 includes electronic device 102 and electronic device 152. The electronic device 102 includes an autocorrelation calculator 105, transceiver 120 coupled to antenna 106, transceiver 124 coupled to antenna 108, and transceiver 128 coupled to antenna 110. The autocorrelation calculator 105 and transceivers 120, 124, 128 may be in communication with one another. Each transceiver 120, 124, 128 may in communication with a respective antenna, such as antenna 106, antenna 108, and antenna 110. The electronic device 152 includes an autocorrelation calculator 155, the transceiver 126 coupled to antenna 162, the transceiver 130 coupled to the antenna 164, and the transceiver 132 coupled to the antenna 166. The autocorrelation calculator 155 and transceivers 126, 130, 132 may be in communication with one another. Each transceiver 126, 130, 132 may in communication with a respective antenna, such as antenna 162, antenna 164, and antenna 166. In other examples, fewer, additional, and/or different components may be provided. For example, while described above with each antenna coupled to respective transceiver, in other examples, multiple antennas may be coupled to a single transceiver of an electronic device. In the example of electronic device 102, while not depicted, the antennas 106, 108, 110 may be coupled to a single transceiver 120 of the electronic device 102, with no transceivers 124, 128 included in that example.

Electronic devices described herein, such as electronic device 102 and electronic device 152 shown in FIG. 1 may be implemented using generally any electronic device for which wireless communication capability is desired. For example, electronic device 102 and/or electronic device 152 may be implemented using a mobile phone, smartwatch, computer (e.g. server, laptop, tablet, desktop), or radio. In some examples, the electronic device 102 and/or electronic device 152 may be incorporated into and/or in communication with other apparatuses for which communication capability is desired, including devices associated with the Internet of Things (IoT), such as but not limited to, an automobile, airplane, helicopter, appliance, tag, camera, or other device.

While not explicitly shown in FIG. 1, electronic device 102 and/or electronic device 152 may include any of a variety of components in some examples, including, but not limited to, memory, input/output devices, circuitry, processing units (e.g. processing elements and/or processors), or combinations thereof. Additionally or alternatively, the electronic devices 102 and 152 may include microphones coupled to a respective transceiver replacing or in addition to the antennas 106-110 and antennas 162-166. For example, a microphone array may be coupled to a single transceiver in the electronic device 102 or each microphone of the microphone array may be coupled to a respective transceiver 120, 124, 128 of the electronic device 102, like the antennas 106-110.

The electronic device 102 and the electronic device 152 may each include multiple antennas. For example, the electronic device 102 and electronic device 152 may each have more than two antennas. Three antennas each are shown in FIG. 1, but generally any number of antennas may be used including 2, 3, 4, 5, 6, 7, 8, 9, 10, 11, 12, 13, 14, 15, 16, 32, 64, or 96 antennas. Other numbers of antennas may be used in other examples. In some examples, the electronic device 102 and electronic device 152 may have a same number of antennas, as shown in FIG. 1. In other examples, the electronic device 102 and electronic device 152 may have different numbers of antennas. Generally, systems described herein may include MIMO systems.

MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 96) antennas to transmit and/or receive transmissions. As the number of antennas increase, so to generally does the complexity involved in accurately transmitting and/or receiving transmissions. Although two electronic devices (e.g. electronic device 102 and electronic device 152) are shown in FIG. 1, generally the system 100 may include any number of electronic devices.

Electronic devices described herein may include receivers, transmitters, and/or transceivers. For example, the electronic device 102 of FIG. 1 includes transceiver 120 and the electronic device 152 includes transceiver 126. Generally, receivers may be provided for receiving transmissions from one or more connected antennas, transmitters may be provided for transmitting transmissions from one or more connected antennas, and transceivers may be provided for receiving and transmitting transmissions from one or more connected antennas.

The transmissions described herein may be in accordance with any of a variety of protocols, including, but not limited to 5G signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (UFMC) transmission, bi orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards. Generally, multiple receivers, transmitters, and/or transceivers may be provided in an electronic device—one in communication with each of the antennas of the electronic device. For example, the transceiver 124 may be used to provide transmissions to and/or receive transmissions from antenna 108, while other transceivers may be provided to provide transmissions to and/or receive transmissions from antenna 106 and antenna 110.

Examples of transmitters, receivers, and/or transceivers described herein, such as the transceiver 120 and transceiver 124 may be implemented using a variety of components, including, hardware, software, firmware, or combinations thereof. For example, transceivers may include circuitry and/or one or more processing units (e.g. processors) and memory encoded with executable instructions for causing the transceiver to perform one or more functions described herein (e.g. software).

Autocorrelation calculators described herein, may calculate an autocorrelation matrix of a received signal of an electronic device. So, for example, the electronic device 152 may include three transceivers, including the transceivers 126, 130, 132, to service antennas 162, 164, 166, respectively. The autocorrelation calculator 155 may be in communication with multiple (e.g. all) of the transceivers of the electronic device 152, and may calculate an autocorrelation utilizing symbols indicative of the RF signals received at the antenna 112, antenna 114, and antenna 116.

It may be desirable in some examples to utilize a calculated autocorrelation in real-time to avoid some issues faced with traditional autocorrelation schemes. For example, and as discussed above, a traditional autocorrelation scheme may queue or store received signals over multiple time periods in a memory space to calculate an overall autocorrelation of those received signals at a later point in time, often utilizing a large memory space to make such a computation. As used herein, each time period of a real-time calculation may be related to a time in which a particular signal is received or a queue length of the autocorrelation calculator described herein. In the latter case, for example, the queue may hold a portion of a received signal and thus that portion of the received signal may be computed in that time period, defined by the length of the queue. This can be referred to as a real-time calculation of the portion of the received signal in an autocorrelation calculation. In such a way, queues may utilize smaller memory spaces.

In some examples, the time period may be related to the sampling period of the samples received during that sampling period or a symbol period of the symbols received during that symbol period, for example, depending on whether a sample or symbol is to be computed as part of the autocorrelation matrix. In a traditional autocorrelation scheme, an autocorrelation may not be calculated until all N samples of the sampling period (or all N symbols of symbol period) for each antenna are received. In such a scheme, the previous N−1 samples (or N−1 symbols) for each antenna are stored in the memory; and the calculation of an autocorrelation may only start when the N'th sample (or N'th symbol) is received. In a real-time calculation, as referred to herein, an autocorrelation matrix may be calculated, when each sample (or symbol) is received at each antenna, for example, by adding a stored autocorrelation matrix to the calculated autocorrelation matrix of that sample received at each antenna, at that time. This iterative calculation may continue to occur during an overall respective sample or symbol time period when further samples or symbols are expected to be received at each antenna, until the respective N'th sample or N'th symbol is received.

It may be desirable for one or more electronic devices described herein to utilize a smaller memory space than a queuing scheme of the aforementioned example utilizing a traditional autocorrelation scheme and queuing over multiple time periods. In some examples, a smaller memory space may occupy an amount of memory related to the number of antennas, rather than an amount of memory related to the number of antennas and the number of samples acquired of the received signal. Particularly as wireless communications incorporate 5G standards, miniaturization of devices may become increasingly desirable, thus limiting the memory space available for some applications, such as a computation of an autocorrelation of received signals.

Accordingly, electronic devices described herein may include one or more autocorrelation calculators. For example, the electronic device 102 may include the autocorrelation calculator 105, and the electronic device 152 may include the autocorrelation calculator 155. Examples of autocorrelation calculators described herein may utilize symbols received from transceivers of the electronic devices 150, 152 to calculate autocorrelation matrices at time periods in which the transceivers receive signals communicated via respective, coupled antennas.

Examples of autocorrelation calculators described herein, including the autocorrelation calculator 105 and the autocorrelation calculator 155 of FIG. 1 may be implemented using hardware, software, firmware, or combinations thereof. For example, the autocorrelation calculator 105 and the autocorrelation calculator 155 may be implemented using circuitry and/or one or more processing unit(s) (e.g. processors) and memory encoded with executable instructions for causing the autocorrelation calculator to perform one or more functions described herein.

Figure 2:
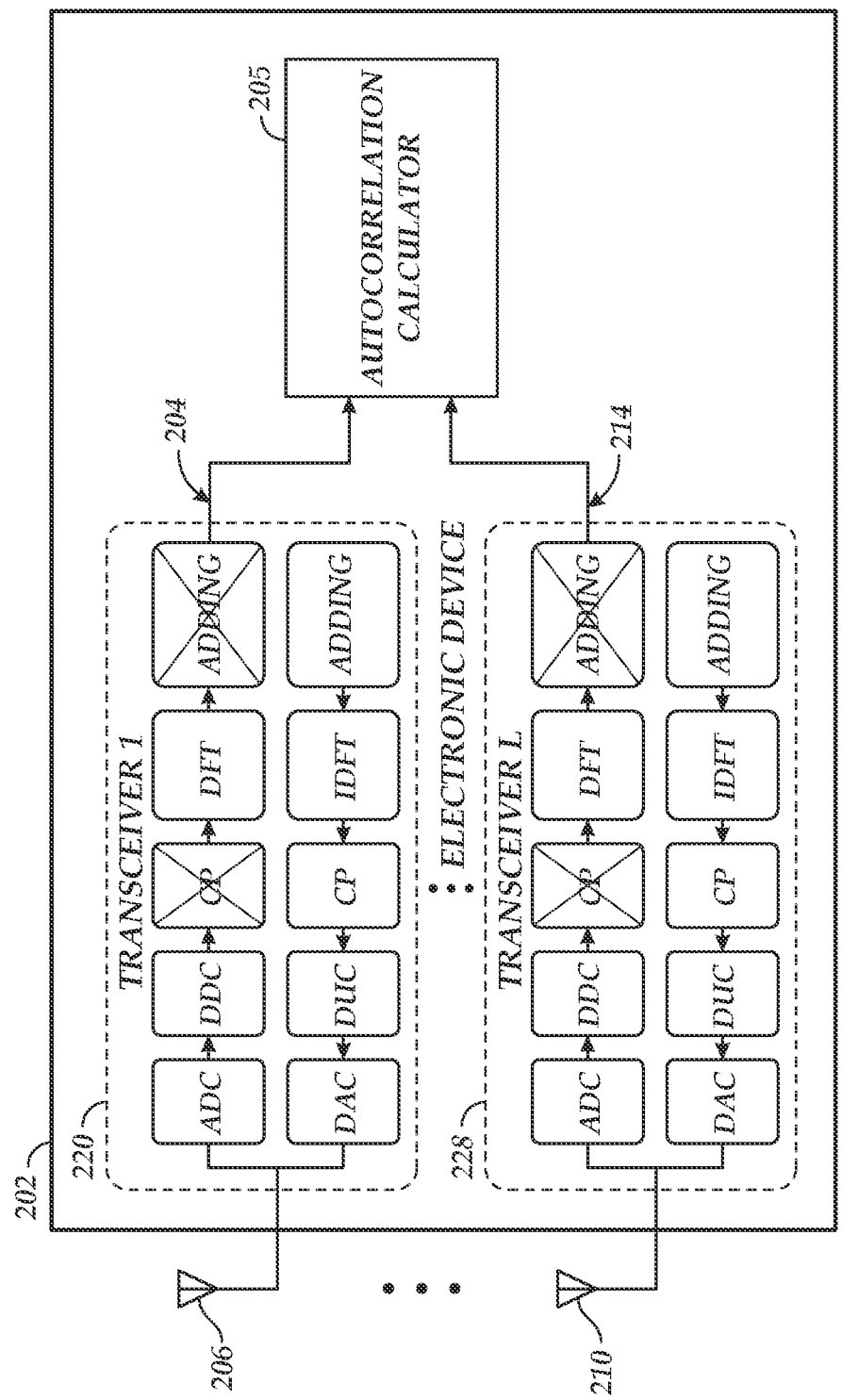
FIG. 2 is a block diagram of an electronic device arranged in accordance with examples described herein.

FIG. 2 is a schematic illustration of an electronic device 202 arranged in accordance with examples described herein. The transceiver 220 may be coupled to antenna 206 and may have a receive path 204. The transceiver 228 may be coupled to antenna 210 and may have a receive path 214. Each receive path 204 and receive path 214 may include an analog-to-digital converter ("ADC") coupled to a respective antenna (e.g., antenna 206 or antenna 210), followed by a digital down-converter ("DDC"), a cyclic prefix remover, a transform (e.g. a discrete Fourier transform, or "DFT"), and an adding removal component. Transmit paths of the transceivers 220, 228 may each include an adding component, an inverse transform (e.g. an inverse Fourier transform), a digital up-converter ("DUC"), and a digital-to-analog converter coupled to a respective antenna (e.g., antenna 206 or antenna 210). In the example, the adding component may add an additional processing field to data in the transmit path, such as a guard interval period, a post-processing field, a sampling field, or a filtering field. In some examples, a decoder and/or precoder may be coupled to the respective receive paths 204, 214, respectively, before symbols are provided to the autocorrelation calculator 205. The transceiver 220 or transceiver 228 may be used to implement and/or be implemented by example transceivers described herein, such as the transceivers 120, 124, 128 and/or the transceivers 126, 130, 132 of FIG. 1. Transceiver 228 may be coupled to antenna 210 and may have a receive path 214 and a transmit path. In some examples, additional, fewer, and/or different components may be included. Generally one transceiver may be provided for each antenna used in an electronic device. Any L number of transceivers may be included in the electronic device 202, with the transceiver 228 being indicated as the Lth transceiver. In such cases, additional receive paths may be provided to the autocorrelation calculator 205.

The autocorrelation calculator 205 may receive symbols indicative of RF energy from the transceivers 220, 228 via the respective receive paths 204, 214. Components of the receive path 204 and/or receive path 214 may be implemented using circuitry (e.g. analog circuitry) and/or digital baseband circuitry in some examples. The autocorrelation calculator 205 may provide a calculated autocorrelation matrix. For example, the autocorrelation calculator may receive various components of a received signal from the receive paths 204, 214, such as a received signal from each antenna 206-210 including respective RF energies of the received signal at that time period. For example, the received signal may be represented as a vector at time period N, with each L antenna receiving a component of the received signal:

$$\begin{pmatrix} x_1(N) \\ x_2(N) \\ \vdots \\ x_L(N) \end{pmatrix}$$

In the example of FIG. 2, the receive path 204 may include the component, $x_1(N)$, that represents a symbol(s) indicative of RF energy received at antenna 206, while the receive path 214 may include the component, $x_L(N)$, that represents a symbol(s) indicative of RF energy received at antenna 210. An autocorrelation matrix may be calculated on the basis of autocorrelation such symbols and adding that autocorrelated matrix to a stored autocorrelation matrix. To perform a calculation utilizing the stored autocorrelation matrix and the received signal at antennas 206-210, an autocorrelation calculation may be represented as.

$$R(N) = R(N-1) + \begin{pmatrix} x_1(N) \\ x_2(N) \\ \vdots \\ x_L(N) \end{pmatrix} (x_1(N), x_2(N), \ldots x_L(N))$$

Accordingly, a stored autocorrelation matrix, $R(N-1)$, may be retrieved from memory and combined in matrix form with the autocorrelation of the symbols indicative of RF energy received at each respective antenna 206-210 at the first time period in which the received signal is received. Advantageously, with the stored autocorrelation matrix, $R(N-1)$, occupying an L×L size of memory and with the vector representative of the symbols indicative of RF energy received at each respective antenna at the first time period occupying L size of memory, the amount of memory occupied in this autocorrelation calculation may be less than that of traditional autocorrelation schemes, for example, as described above, with respect to the example of an autocorrelation scheme utilizing an N L size of memory.

Examples of autocorrelation calculators described herein, such as the autocorrelation calculator 205 may receive information from a number of wireless communication channels (e.g., receive paths 204, 214). Any number of antennas (and corresponding inputs to the autocorrelation calculator 205) may be used. Accordingly, time-domain symbols may be provided to the autocorrelation calculator 205. Referring back to FIG. 1, for example, the autocorrelation calculator 105 may receive symbols indicative of RF energy in a portion of the wireless spectrum incident on antenna 106, antenna 108, and/or antenna 110. A corresponding one of the transceivers 120, 124, 128 may process the symbols indicative of RF energy in a portion of the wireless spectrum to generate time-domain symbols indicative of data of control information. The autocorrelation calculator 105 may receive the symbols processed by the transceivers for calculation of an autocorrelation matrix, for example, received via respective receive paths of the transceivers 120, 124, 128.

Any portion of the wireless spectrum may be utilized in computing autocorrelation matrices. For example, the antennas may be tuned to a particular frequency and/or frequency band, and consequently the data provided by those antennas may relate to that particular frequency and/or frequency band. Examples of frequency bands include those licensed by the FCC, and generally may include any RF frequencies. Generally, RF frequencies may range from 3 Hz to 3000 GHz in some examples. In some examples, a particular band may be of interest. Examples of bands include all or portions of a very high frequency (VHF) band (e.g. 30-300 Mhz), all or portions of an ultra high frequency (UHF) band (e.g. 300-3000 MHz), and/or all or portions of a super high frequency (SHF) band (e.g. 3-30 GHz). Example bands may include 5G wireless frequency ranges, such as utilizing a carrier frequency in the E band (e.g., 71 76 GHz and 81-86 GHz), a 28 GHz Millimeter Wave (mmWave) band, or a 60 GHz V band (e.g., implementing a 802.11 ad protocol). Example autocorrelation calculators may calculate matrices based on RF energy from a portion of a wireless spectrum of generally any width (e.g. 5, 10, 15, 20, 25, 30, 35, 40, 45, 50 or more MHz widths). The analog to digital conversion operation in receive paths 204, 214 may convert RF energy from an analog signal to a digital RF signal.

The digital down conversion operation in receive paths 204, 214 may down convert frequency domain symbols at a certain frequency band to a baseband processing range. In examples where signals may be received by the transceiver 220, 228, the time-domain symbols may be mixed with a local oscillator frequency to generate 5G symbols at a baseband frequency range. Accordingly, the RF energy that may include time-domain symbols may be digitally down-converted to baseband. The adding removal component in the receive paths 204, 214 may remove an added processing field from the baseband data, such as a guard interval, from the frequency-domain 5G symbols. A DFT operation in the receive paths 204, 214 may be implemented as an FFT operation that transforms the time-domain symbols into frequency-domain symbols. For example, taking an example of an OFDM wireless protocol scheme, the FFT can be applied as N-point FFT $$X_n = \sum_{k=1}^{N} x_k e^{-i2\pi kn/N} \qquad (12)$$

where $X_n$ is the modulated symbol sent in the nth OFDM sub-carrier. Accordingly, the output of the FFT operation may form frequency-domain OFDM symbols. In some examples, the FFT may be replaced by poly-phase filtering banks to output symbols for the synchronization operation.

As described herein, the operations of the electronic device 202 can include a variety of RF processing operations performed with analog circuits and/or digital implementations of analog circuits. Such operations can be implemented in a conventional wireless transceiver, with each operation implemented by specifically-designed hardware for that respective operation. For example, a DSP processing unit may be specifically-designed to implement the FFT operation. As can be appreciated, additional operations of a wireless transceiver may be included in a conventional wireless transceiver, and some operations described herein may not be implemented in a conventional wireless receiver. Accordingly, while specific components are not depicted in FIG. 2 that represent a corresponding specifically-designed hardware component of a transceiver 220, 228, it can be appreciated that the electronic device 202 may include such components and process the symbols indicative of RF energy as described herein.

In calculating an autocorrelation matrix in accordance with the examples described herein, the autocorrelation calculator 205 may determine a set of weights based on the calculated, cumulative autocorrelation matrix. The set of weights may be utilized to compensate received signals received at antennas 206-210 for the effects of the wireless channel, noises introduced by the electronic device 202, or any other effect that may alter a calibration signal utilizing in calibrating the electronic device 202. The electronic device 202 may utilize a calibration signal, as described herein, for the determination of the set of weights to be utilized in compensating RF energies received at the electronic device 202. Advantageously, in calibrating the electronic device 202 or in receiving received signals to which a set of weights are applied, the autocorrelation calculator 205 may calculate autocorrelation matrices with increased speed, while also utilizing less memory space.

Accordingly, for electronic devices that change operating environments quickly, the autocorrelation calculator 205 may continue to calculate and update a set of weights to be applied to receive signals. For example, a mobile device rendering video may change environments quickly. By calibrating a new set of weights in that new environment at specific time periods with a piece-wise autocorrelation matrix, the mobile device may render the video more quickly than a traditional autocorrelation scheme. The mobile device may utilized updated versions of the auto-correlation matrix to determine a set of weights, for example.

Figure 3:
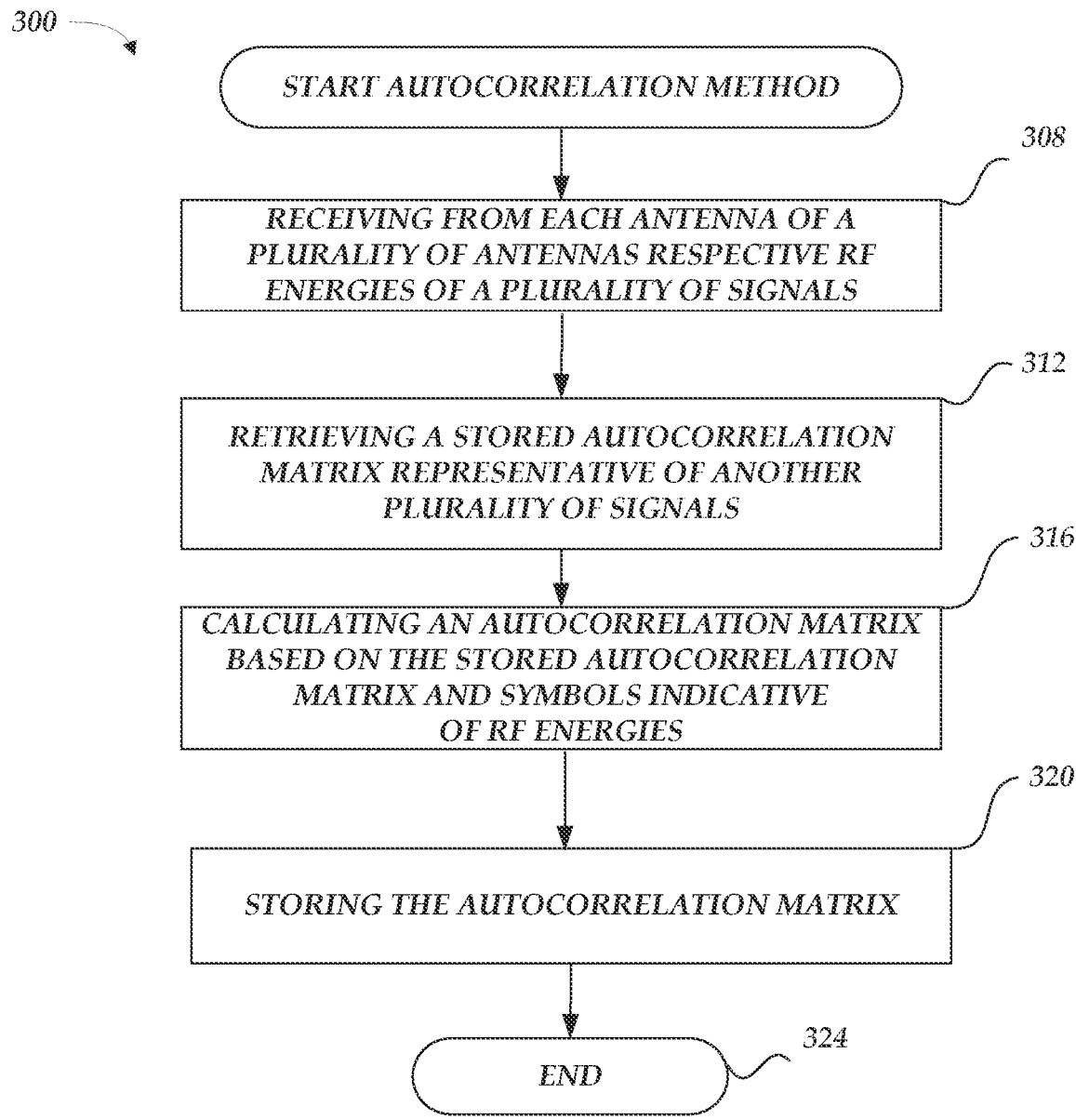
FIG. 3 is a flow diagram of a method arranged in accordance with examples described herein.

FIG. 3 is a flowchart of a method 300 in accordance with examples described herein. Example method 300 may be implemented using, for example, system 100 in FIG. 1, electronic device 202 in FIG. 2, system 400 in FIG. 4, or any system or combination of the systems depicted in FIGS. 1-2 and 4-8 described herein. The operations described in blocks 308-324 may also be stored as computer-executable instructions in a computer-readable medium such as memory units (e.g., memory unit 440*a*).

Example method 300 may begin the autocorrelation method. At block 308, the method 300 may include receiving from each antenna of a plurality of antennas respective RF energies of a plurality of signals. For example, in the context of FIG. 2, antennas 206, 210 may receive respective RF energies (e.g., RF signals at respective portions of the wireless spectrum. In the example, the RF signals may be processed by the respective transceivers 220, 228. At block 312, the method 300 may include retrieving a stored auto-correlation matrix representative of another plurality of signals. For example, in the context of FIG. 4, an autocorrelation calculator 405 may retrieve a stored autocorrelation matrix from the memory unit 440*a* or the memory unit 440*b*. The stored autocorrelation matrix may occupy a space in one of the memory units 440*a*, 440*b* that is related to a number of antennas. For example, the number of antennas may be a number of antennas coupled to an electronic device 202. In the example, the autocorrelation calculator 405 may request the stored autocorrelation matrix from a memory that is part of an implementing computing device (e.g., electronic device 202), from a memory part of an external computing device, or from a memory implemented in a cloud-computing device. In turn, the memory may send the stored auto-correlation matrix as requested by the autocorrelation calculator 405.

At block 316, the method 300 may include calculating an autocorrelation matrix based on the stored autocorrelation matrix and symbols indicative of RF energies. For example, in the context of FIG. 4, an autocorrelation calculator 405 may occupy a memory space to perform a calculation with an autocorrelation matrix and a signal received at a plurality of antennas. The symbols indicative of the RF energies may be representative of the signal received at the plurality of antennas. As described herein, to calculate the autocorrelation matrix, the symbols indicative of the respective RF energies may be autocorrelated, and combined with (e.g., added) a respective version of the autocorrelation matrix, for example, the stored autocorrelation matrix. The memory space in which the calculation is performed may include the memory space from which the stored autocorrelation matrix was received. The calculated autocorrelation matrix may be based on the stored autocorrelation matrix and the signal received at the plurality of antennas. The calculated autocorrelation matrix may be referred to as an updated autocorrelation matrix. For example, the stored autocorrelation matrix may not be utilized in subsequent calculations. The updated autocorrelation matrix may be utilized as a stored autocorrelation matrix in subsequent calculations, once it has been stored.

At block 320, the method 300 may include storing the autocorrelation matrix. For example, in the context of FIG. 4, an autocorrelation calculator 405 may store the autocorrelation matrix in the memory unit 440a or the memory unit 440b. The autocorrelation matrix that is stored may be an updated autocorrelation matrix. In some examples, the updated autocorrelation matrix may be stored in the memory space in which the stored autocorrelation matrix was retrieved. To store the autocorrelation matrix, the autocorrelation calculator may provide a memory command associated with storing the updated autocorrelation matrix in the memory space to the memory unit 440a or the memory unit 440b via, respective, memory interfaces 435a, 435b. Thereafter, block 320 may be followed by block 324 that ends the method 300.

The blocks included in the described example method 300 are for illustration purposes. In some examples, the blocks may be performed in a different order. In some other examples, various blocks may be eliminated. In still other cases, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 4:
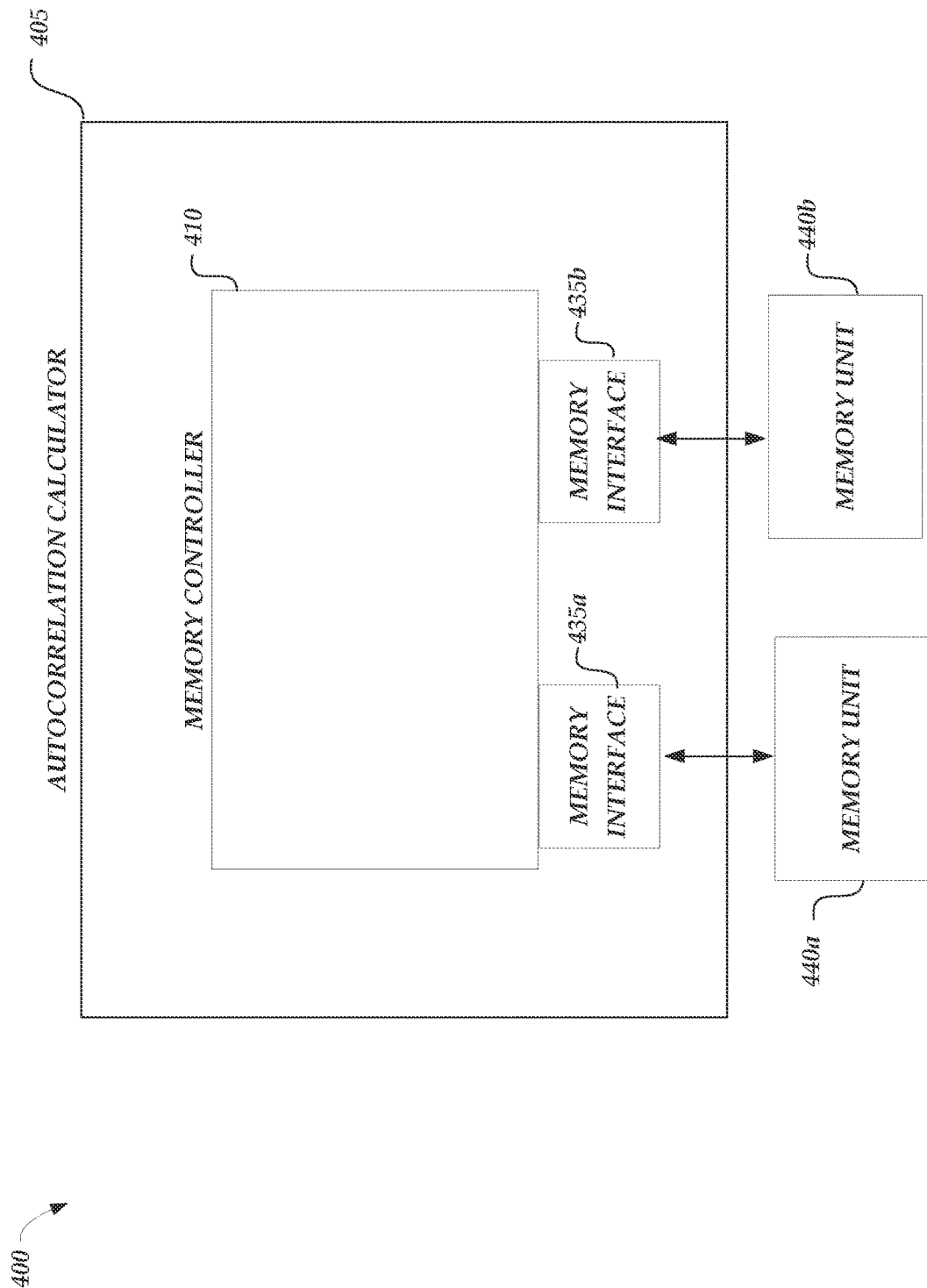
FIG. 4 is a block diagram of a system arranged in accordance with examples described herein.

FIG. 4 is a block diagram of a computing system 400 arranged in accordance with examples described herein. The computing system 400 includes an autocorrelation calculator 405 coupled to memory units 440a, 440b. The autocorrelation calculator 405 may implement a memory controller 410 to retrieve, calculate, and store autocorrelation matrices. The memory controller 410 may be coupled to the memory units 440a, 440b via memory interfaces 435a, 435b. The memory controller 410 may implement memory commands received from various data sources or processes being executed on the autocorrelation calculator 405. For example, the memory controller 410 may receive memory access requests (e.g., read or write commands) from a process being executed on the autocorrelation calculator 405. In such a case, the memory controller 410 may process the memory access requests, as implemented by the autocorrelation calculator 405, to access one or more of the memory units 440a, 440b.

The autocorrelation calculator 405 may be used to implement a computing system utilizing the memory controller 410. The autocorrelation calculator 405 may be a multi-core processor in some examples that includes a plurality of cores. The plurality of cores may for example be implemented using processing circuits which read and execute program instructions independently. The memory controller 410 may handle communication with the memory system that may be outside of the autocorrelation calculator 405. For example, the memory controller 410 may provide access commands to the memory units 440a, 440b from the plurality of cores of the autocorrelation calculator 405. The memory controller 410 may provide such access commands via memory interfaces 435a, 435b. For example, the memory interfaces 435a, 435b may provide a clock signal, a command signal, and/or an address signal to any of the memory units 440a, 440b. While writing data by storing the data in the memory units 440a, 440b, the memory controller 410 provides instructions to write data to the memory units 440a, 440b based on a write command. While reading the stored data from the memory units 440a, 440b, the memory controller 410 provides instructions based on a read command and receives the data from the memory units 440a, 440b.

The memory controller 410 may be implemented using circuitry which controls the flow of data to the memory units 440a, 440b. The memory controller 410 may be a separate chip or integrated circuit coupled to the autocorrelation calculator 405 or being implemented on the autocorrelation calculator 405, for example, as a core of the autocorrelation calculator 405 to control the memory system of the computing system 400. In some examples, the memory controller 410 may be integrated into the autocorrelation calculator 405 to be referred to as integrated memory controller (IMC).

The memory controller 410 may communicate with a plurality of memory units to implement a memory system with the autocorrelation calculator 405. For example, the memory units 440a, 440b, may communicate simultaneously with the memory controller 410. While the example of FIG. 4 depicts two memory units 440a, 440b, it can be expected that the memory controller 410 may interact with any number of memory units. For example, eight memory units may be included and each memory unit may include a data bus having an eight-bit width, thus the memory system implemented by the autocorrelation calculator 405 may have a sixty-four bit width. The memory units 440a, 440b may be dynamic random-access memory (DRAM) or nonvolatile random-access memory (RAM), such as static RAM (SRAM), ferroelectric RAM (FeRAM), spin-transfer-torque RAM (STT-RAM), phase-change RAM (PCRAM), resistance change RAM (ReRAM), phase change memory, 3D XPoint, or the like. In an example implementation, the memory unit 440a may correspond to a cache and/or SRAM and the memory unit 440b may correspond to DRAM. Because of the lesser memory space utilized in the autocorrelation schemes described herein, the memory controller 410 may determine to control only the memory unit 440a with the cache and/or SRAM to perform the autocorrelation calculations. In other example implementations, the memory controller 410 may increase the speed of autocorrelation calculation in utilizing both memory units 440a, 440b. For example, the memory unit 440a may be utilized as storage for a version of the autocorrelation matrix, and the memory unit 440b may be utilized to perform the autocorrelation calculation including storage of the symbols indicative of the RF energies received at the plurality of antennas queued in the DRAM.

In various examples, such memory units may be referred to as memory chips, memory modules, memory dies, memory cards, memory devices, memory arrays, and/or memory cells. Physically, the memory units 440a, 440b may be arranged and disposed as one layer, or may be disposed as stacked layers. In some examples, the memory units 440a, 440b may be disposed as multiple layers, on top of each other, to form vertical memory, such as 3D NAND Flash memory.

In some examples where the memory units 440a, 440b may be implemented using DRAM or non-volatile RAM integrated into a single semiconductor chip, the memory units 440a, 440b may be mounted on a memory module substrate, a mother board or the like. For example, the memory units 440a, 440b be referred to as memory chips. The memory units 440a, 440b may include a memory cell array region and a peripheral circuit region. The memory cell array region includes a memory cell array with a plurality of banks, each bank including a plurality of word lines, a plurality of bit lines, and a plurality of memory cells arranged at intersections of the plurality of word lines and the plurality of bit lines. The selection of the bit line may be performed by a plurality of column decoders and the selection of the word line may be performed by a plurality of row decoders.

The peripheral circuit region of the memory units 440a, 440b may include clock terminals, memory address terminals, command terminals, and data input/output (I/O) terminals (DQ). For example, the data I/O terminals may handle eight-bit data communication. Data input output (I/O) buffers may be coupled to the data input/output terminals (DQ) for data accesses, such as read accesses and write accesses of memories. The memory address terminals may receive address signals and bank address signals. The bank address signals may be used for selecting a bank among the plurality of banks. A row address and a column address may be provided as address signals. The command terminals may include a chip select (/CS) pin, a row address strobe (/RAS) pin, a column address strobe (/CAS) pin, a write enable (/WE) pin, and/or the like. A command decoder may decode command signals received at the command terminals from the memory controller 410 via one of the memory interfaces 435a, 435b to receive various commands including a read command and/or a write command. Such a command decoder may provide control signals responsive to the received commands to control the memory cell array region. The clock terminals may be supplied with an external clock signal, for example from one of the memory interfaces 435a, 435b.

While the computing system 400 has been described in the context of an implementation of the autocorrelation calculator 405, it can be expected that the computing system 400 may also be implemented differently in other examples. For example, the computing system 400 may be included in either of the electronic devices 102, 152 or 202 of FIGS. 1 and 2, respectively. The autocorrelation calculators 105, 155, 204 may be implemented as the autocorrelation calculator 405, for example. In the context of FIG. 2, the autocorrelation calculator 205, implemented as the autocorrelation calculator 405, may be coupled to transceivers 220, 228 as a separate circuit such as an application specific integrated circuits (ASIC), a digital signal processor (DSP) implemented as part of a field-programmable gate array (FPGA), or a system-on-chip (SoC). Additionally or alternatively, the autocorrelation calculator 405 may be implemented using any system or combination of the systems depicted in FIGS. 1-2 and 4-8 described herein.

Figure 5:
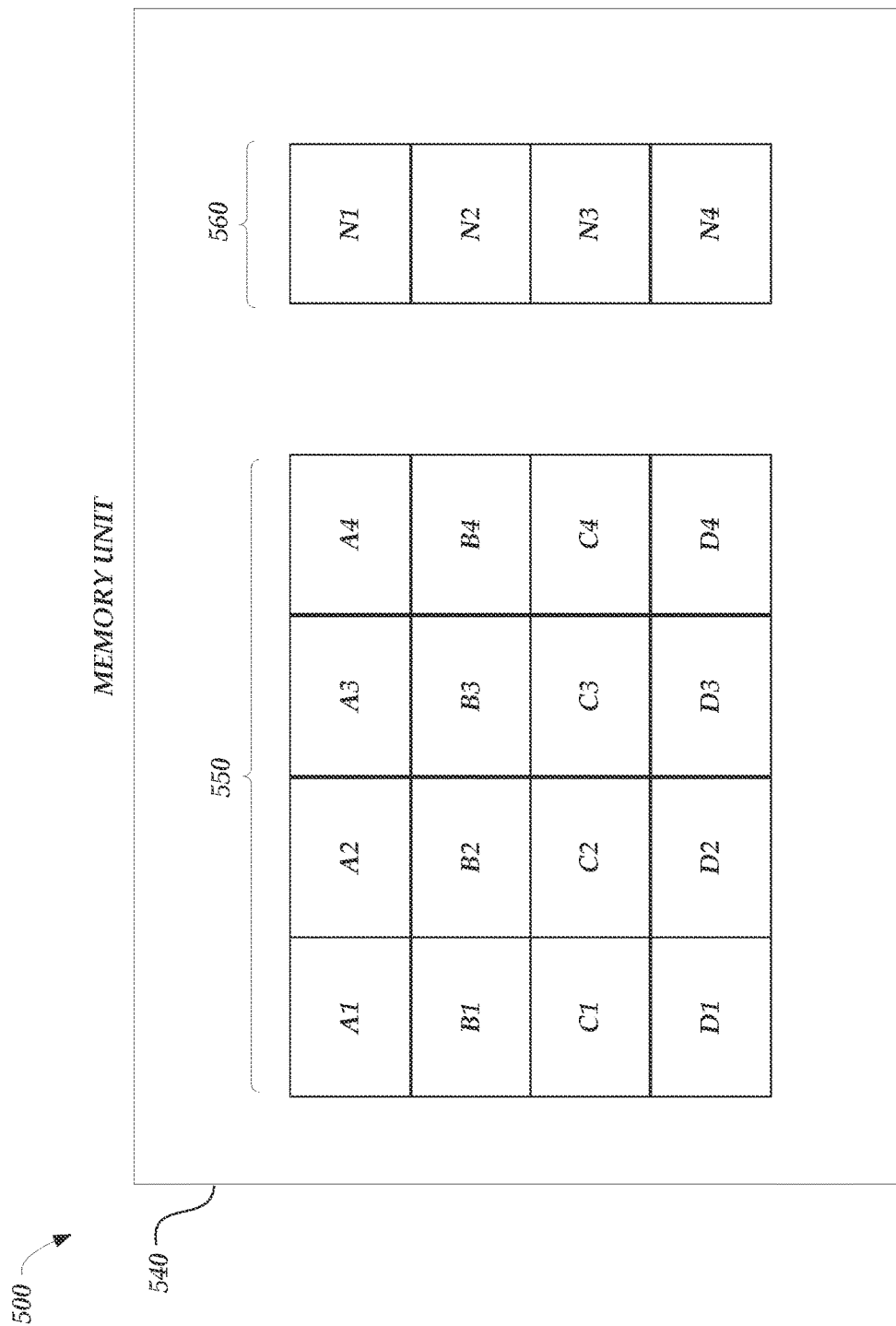
FIG. 5 is a block diagram of a memory unit being accessed in accordance with exampled described herein.

FIG. 5 is a block diagram of a memory unit 540 being accessed in accordance with exampled described herein. The memory cells of the memory unit 540, which include memory cells labeled as A1-A4, B1-B4, C1-C4, and D1-D4 and memory cells 560 labeled as N1-N4, are schematically illustrated in a memory system 500. In the example of FIG. 5, the memory unit 540 may be a memory array including the memory cells 550. The memory system 500 receives a memory command for retrieval, calculation, or storage of an autocorrelation matrix. For example, a memory controller implemented in or in conjunction with an autocorrelation calculator, such as the memory controller 410 in the autocorrelation calculator 405 of FIG. 4, may access the memory cells 550 and 560 for calculation of an autocorrelation matrix.

In the context of FIG. 4, an autocorrelation calculator 405 may retrieve (e.g., read request) a stored autocorrelation matrix from the memory unit 540 stored in the memory cells 550, for example. During a calculation of an autocorrelation matrix, memory controller 410 may also request access to memory cells 560 to queue or occupy a memory space for a received signal. For example, in the context of FIG. 2, each memory cell N1-N4 560 may provide a memory space for a corresponding component of a received signal. For example, in the context of FIG. 2, if the number of antennas of the electronic device included four antennas, the receive path 204 may include the component, $x_1(N)$, that represents a symbol(s) indicative of RF energy received at antenna 206, while the receive path 214 may include the component, $XL(N)$, that represents a symbol(s) indicative of RF energy received at antenna 210. The component $x_L(N)$ may occupy the memory cell N1 and the component $x_L(N)$ may occupy the memory cell N4. In the example, additional components received from the other two antennas (not depicted in FIG. 2) may occupy memory cells N2 and N3. Because the number of antennas in the example is four antennas, a stored autocorrelation matrix be a size of 4×4 matrix, occupying the memory space corresponding to the memory cells 550.

The amount or quantity of memory cells accessed may be related to a number of antennas. For example, the stored autocorrelation matrix may occupy the memory cells 500 which is related to a number of antennas. For example, the number of antennas may be a number of antennas coupled to an electronic device 202. In the example, the autocorrelation calculator 405 may request the stored autocorrelation matrix from the memory cells 550. In turn, the memory unit 540 may provide the stored autocorrelation matrix as requested by the autocorrelation calculator 405. The memory space (e.g., memory cells 550, 560) in which the calculation is performed may include the memory space from which the stored autocorrelation matrix was received (e.g., memory cells 550).

A calculated autocorrelation matrix may be stored (e.g., a write request) in the same memory space from which the stored autocorrelation matrix was retrieved—the memory cells 500. Once stored in the memory cells 500, this calculated autocorrelation matrix may be referred to as an updated autocorrelation matrix and may be utilized as a stored autocorrelation matrix in subsequent calculations. Additionally or alternatively, in subsequent calculations, the memory cells 560 may be utilized again to read/write or occupy a received signal from a different time period. Accordingly, the memory cells 550, 560 of the memory unit 540 may be accessed for retrieval, calculation, or storage in accordance with the examples described herein related to the calculation of an autocorrelation matrix.

While described in FIG. 5 in the context of a two-dimensional memory array, it can be expected that memory access commands may be configured for memory in a three-dimensional or N-dimensional space; for example, to process matrix operations with corresponding memory commands in that three-dimensional or N-dimensional space.

Figure 6:
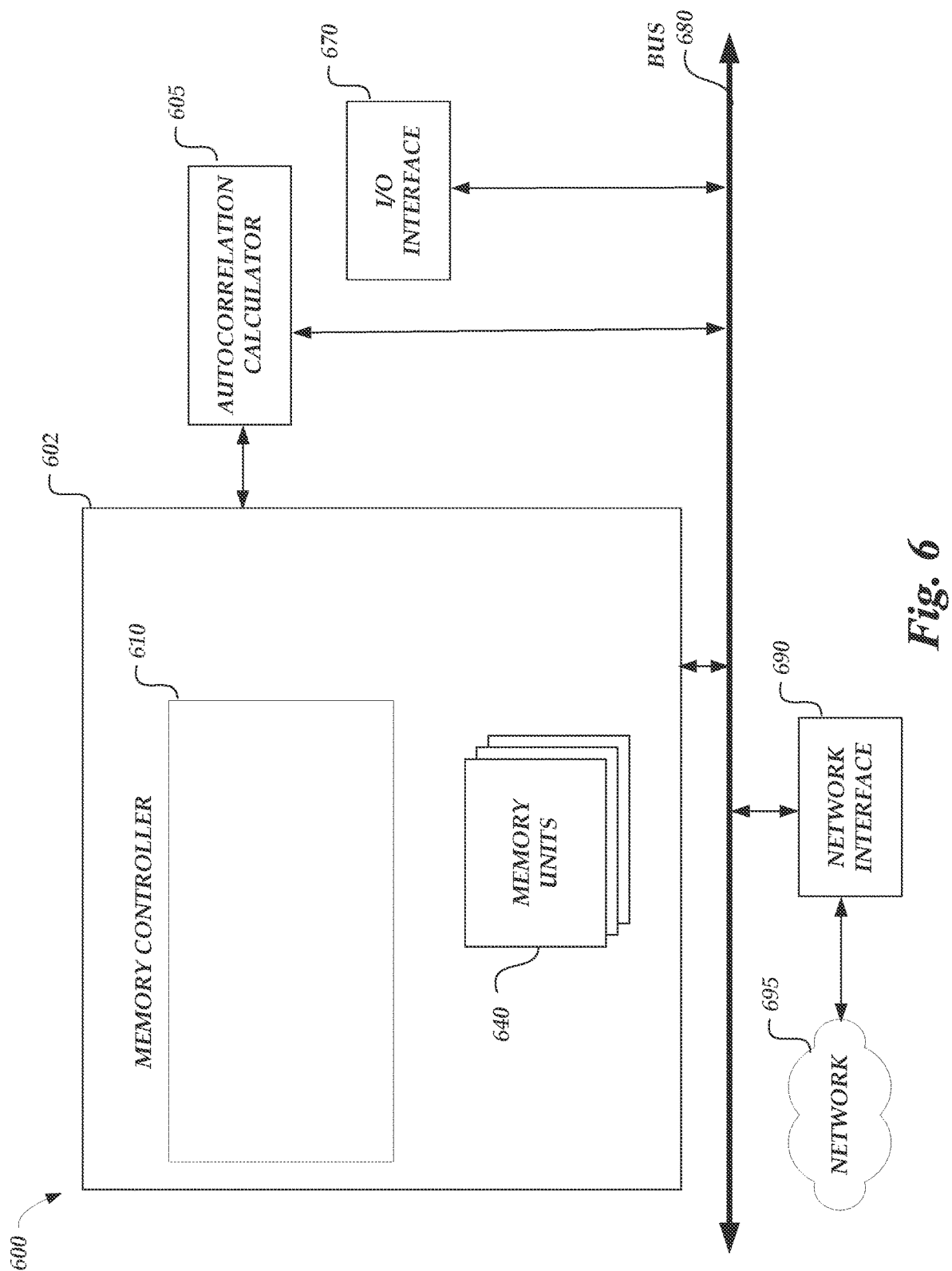
FIG. 6 is a block diagram of a computing device arranged in accordance with examples described herein.

FIG. 6 is a block diagram of a computing device 600 arranged in accordance with examples described herein. The computing device 600 may operate in accordance with any example described herein. The computing device 600 may implemented in a smartphone, a wearable electronic device, a server, a computer, an appliance, a vehicle, or any type of electronic device. The computing device 600 includes a memory system 602, an autocorrelation calculator 605, and I/O interface 670, and a network interface 690 coupled to a network 695. The memory system 602 includes a memory controller 610. Similarly numbered elements of FIG. 6 include analogous functionality to those numbered elements of FIGS. 4-5. For example, the memory units 640 may operate and be configured like the memory units 440a, 440b of FIG. 4 or memory unit 540 of FIG. 5. Autocorrelation calculator 605 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide processing for device 600.

The memory system 602 includes memory units 540, which may be non-transitory hardware readable medium including instructions, respectively, for calculating an autocorrelation matrix or be memory units for the retrieval, calculation, or storage of an autocorrelation matrix. The autocorrelation calculator 605 may control the memory system 602 with control instructions that indicate when to execute such stored instructions for calculating an autocorrelation matrix or for the retrieval or storage of an autocorrelation matrix. Upon receiving such control instructions, the memory controller 610 may execute such instructions. For example, such instructions may include a program that executes the method 300. Communications between the autocorrelation calculator 605, the I/O interface 670, and the network interface 690 are provided via an internal bus 680. The autocorrelation calculator 605 may receive control instructions from the I/O interface 670 or the network interface 690, such as instructions to calculate an autocorrelation matrix.

Bus 680 may include one or more physical buses, communication lines/interfaces, and/or point-to-point connections, such as Peripheral Component Interconnect (PCI) bus, a Gen-Z switch, a CCIX interface, or the like. The I/O interface 670 can include various user interfaces including video and/or audio interfaces for the user, such as a tablet display with a microphone. Network interface 690 communications with other computing devices, such as computing device 600 or a cloud-computing server, over the network 695. For example, the network interface 690 may be a USB interface.

Figure 7:
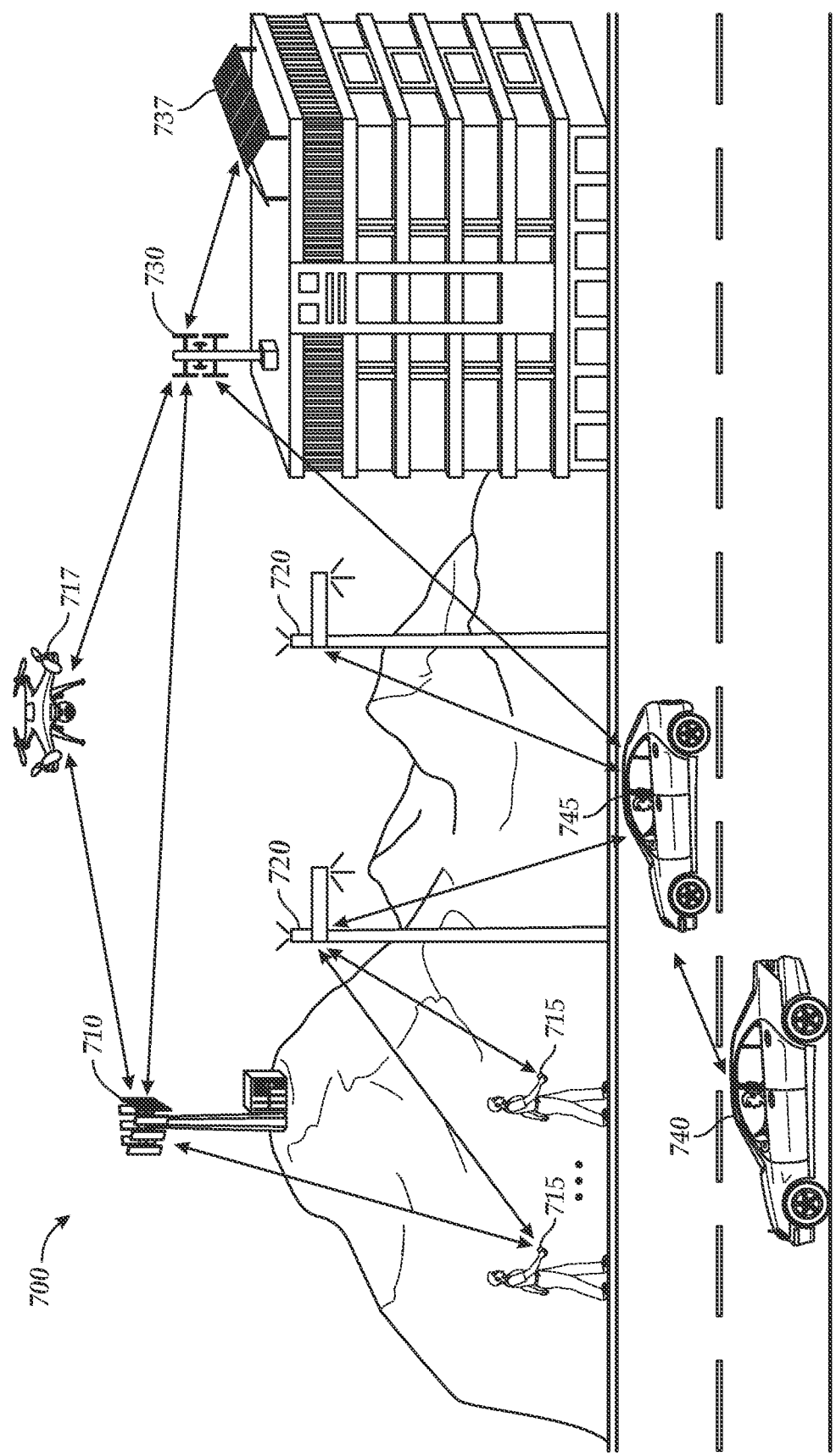
FIG. 7 is a block diagram of a wireless communications system arranged in accordance with aspects of the present disclosure.

FIG. 7 is a block diagram of a wireless communications system 700 in accordance with aspects of the present disclosure. The wireless communications system 700 includes a base station 710, a mobile device 715, a drone 717, a small cell 730, and vehicles 740, 745. The base station 710 and small cell 730 may be connected to a network that provides access to the Internet and traditional communication links. The system 700 may facilitate a wide-range of wireless communications connections in a wireless communication (e.g., 5G) system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 700 may depict aspects of a radio access network (RAN), and system 700 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 710, communication devices 720, and small cells 730 may be coupled with the core network or with one another, or both, via wired or wireless backhaul links (e.g., SI interface, X2 interface, etc.).

The system 700 may provide communication links connected to devices or "things," such as sensor devices, e.g., solar cells 737, to provide an IoT framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 1, 5, 10, or 20 MHz, for example.

Additionally or alternatively, the IoT may include devices or things operating at different frequencies than traditional cellular technology to facilitate use of the wireless spectrum. For example, an IoT framework may allow multiple devices in system 700 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 737, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment.

In such a 5G framework, devices may perform functionalities performed by base stations in other mobile networks (e.g., UMTS or LTE), such as forming a connection or managing mobility operations between nodes (e.g., handoff or reselection). For example, mobile device 715 may receive sensor data from the user utilizing the mobile device 715, such as blood pressure data, and may transmit that sensor data on a narrowband IoT frequency band to base station 710. In such an example, some parameters for the determination by the mobile device 715 may include availability of licensed spectrum, availability of unlicensed spectrum, and/or time-sensitive nature of sensor data. Continuing in the example, mobile device 715 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 715 may form device-to-device (D2D) connections with other mobile devices or other elements of the system 700. For example, the mobile device 715 may form RFID, WiFi, MultiFire, Bluetooth, or Zigbee connections with other devices, including communication device 720 or vehicle 745. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 715 to provide information (e.g., sensor data) collected on different frequency bands than a frequency band determined by mobile device 715 for transmission of that information.

Moreover, some communication devices may facilitate ad-hoc networks, for example, a network being formed with communication devices 720 attached to stationary objects (e.g., lampposts in FIG. 7) and the vehicles 740, 745, without a traditional connection to a base station 710 and/or a core network necessarily being formed. Other stationary objects may be used to support communication devices 720, such as, but not limited to, trees, plants, posts, buildings, blimps, dirigibles, balloons, street signs, mailboxes, or combinations thereof. In such a system 700, communication devices 720 and small cell 730 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 715 communicating with base station 710 on a cellular communication band.

The communication devices 720 may form wireless networks, operating in either a hierarchal or ad-hoc network fashion, depending, in part, on the connection to another element of the system 700. For example, the communication devices 720 may utilize a 700 MHz communication frequency to form a connection with the mobile device 715 in an unlicensed spectrum, while utilizing a licensed spectrum communication frequency to form another connection with the vehicle 745. Communication devices 720 may communicate with vehicle 745 on a licensed spectrum to provide direct access for time-sensitive data, for example, data for an autonomous driving capability of the vehicle 745 on a 5.9 GHz band of Dedicated Short Range Communications (DSRC).

Vehicles 740 and 745 may form an ad-hoc network at a different frequency band than the connection between the communication device 720 and the vehicle 745. For example, for a high bandwidth connection to provide time-sensitive data between vehicles 740, 745, a 24 GHz mmWave band may be utilized for transmissions of data between vehicles 740, 745. For example, vehicles 740, 745 may share real-time directional and navigation data with each other over the connection while the vehicles 740, 745 pass each other across a narrow intersection line. Each vehicle 740, 745 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 720 and the vehicle 745, for example, for processing of image data received at both vehicle 745 and vehicle 740, as transmitted by the vehicle 740 to vehicle 745 over the 24 GHz mmWave band. While shown as automobiles in FIG. 5, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 700 in other mmWave bands or other frequency bands, such as 28 GHz, 37 GHz, 38 GHz, 39 GHz, which may be licensed or unlicensed bands. In some cases, vehicles 740, 745 may share the frequency band that they are communicating on with other vehicles in a different network. For example, a fleet of vehicles may pass vehicle 740 and, temporarily, share the 24 GHz mmWave band to form connections among that fleet, in addition to the 24 GHz mmWave connection between vehicles 740, 745. As another example, communication device 720 may substantially simultaneously maintain a 700 MHz connection with the mobile device 715 operated by a user (e.g., a pedestrian walking along the street) to provide information regarding a location of the user to the vehicle 745 over the 5.9 GHz band. In providing such information, communication device 720 may leverage antenna diversity schemes as part of a massive MIMO framework to facilitate time-sensitive, separate connections with both the mobile device 715 and the vehicle 745. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 710 and small cell 730 may wirelessly communicate with devices in the system 700 or other communication-capable devices in the system 700 having at the least a sensor wireless network, such as solar cells 737 that may operate on an active/sleep cycle, and/or one or more other sensor devices. The base station 710 may provide wireless communications coverage for devices that enter its coverages area, such as the mobile device 715 and the drone 717. The small cell 730 may provide wireless communications coverage for devices that enter its coverage area, such as near the building that the small cell 730 is mounted upon, such as vehicle 745 and drone 717.

Generally, a small cell 730 may be referred to as a small cell and provide coverage for a local geographic region, for example, coverage of 200 meters or less in some examples. This may be contrasted with at macrocell, which may provide coverage over a wide or large area on the order of several square miles or kilometers. In some examples, a small cell 730 may be deployed (e.g., mounted on a building) within some coverage areas of a base station 710 (e.g., a macrocell) where wireless communications traffic may be dense according to a traffic analysis of that coverage area. For example, a small cell 730 may be deployed on the building in FIG. 7 in the coverage area of the base station 710 if the base station 710 generally receives and/or transmits a higher amount of wireless communication transmissions than other coverage areas of that base station 710. A base station 710 may be deployed in a geographic area to provide wireless coverage for portions of that geographic area. As wireless communications traffic becomes more dense, additional base stations 710 may be deployed in certain areas, which may alter the coverage area of an existing base station 710, or other support stations may be deployed, such as a small cell 730. Small cell 730 may be a femtocell, which may provide coverage for an area smaller than a small cell (e.g., 100 meters or less in some examples (e.g., one story of a building)).

While base station 710 and small cell 730 may provide communication coverage for a portion of the geographical area surrounding their respective areas, both may change aspects of their coverage to facilitate faster wireless connections for certain devices. For example, the small cell 730 may primarily provide coverage for devices surrounding or in the building upon which the small cell 730 is mounted. However, the small cell 730 may also detect that a device has entered is coverage area and adjust its coverage area to facilitate a faster connection to that device.

For example, a small cell 730 may support a massive MIMO connection with the drone 717, which may also be referred to as an unmanned aerial vehicle (UAV), and, when the vehicle 745 enters it coverage area, the small cell 730 adjusts some antennas to point directionally in a direction of the vehicle 745, rather than the drone 717, to facilitate a massive MIMO connection with the vehicle, in addition to the drone 717. In adjusting some of the antennas, the small cell 730 may not support as fast as a connection to the drone 717, as it had before the adjustment. However, the drone 717 may also request a connection with another device (e.g., base station 710) in its coverage area that may facilitate a similar connection as described with reference to the small cell 730, or a different (e.g., faster, more reliable) connection with the base station 710. Accordingly, the system 700 may enhance existing communication links in providing additional connections to devices that may utilize or demand such links. For example, the small cell 730 may include a massive MIMO system that directionally augments a link to vehicle 745, with antennas of the small cell directed to the vehicle 745 for a specific time period, rather than facilitating other connections (e.g., the small cell 730 connections to the base station 710, drone 717, or solar cells 737). In some examples, drone 717 may serve as a movable or aerial base station.

The wireless communications system 700 may include devices such as base station 710, communication device 720, and small cell 730 that may support several connections to devices in the system 700. Such devices may operate in a hierarchal mode or an ad-hoc mode with other devices in the network of system 700. While described in the context of a base station 710, communication device 720, and small cell 730, it can be appreciated that other devices that can support several connections with devices in the network may be included in system 700, including but not limited to: macrocells, femtocells, routers, satellites, and RFID detectors.

In various examples, the elements of wireless communication system 700, such as base station 710, a mobile device 715, a drone 717, communication device 720 a small cell 730, and vehicles 740, 745, may be implemented utilizing an autocorrelation calculator as described herein. For example, the communication device 720 may include system 100 in FIG. 1, electronic device 202 in FIG. 2, system 400 in FIG. 4. For example, the communication device 720 may be implemented as the electronic device 202. In various examples, the elements of communication system 700 may be implemented using, for example, system 100 in FIG. 1, electronic device 202 in FIG. 2, system 400 in FIG. 4, or any system or combination of the systems depicted in FIGS. 1-2 and 4-8 described herein.

Figure 8:
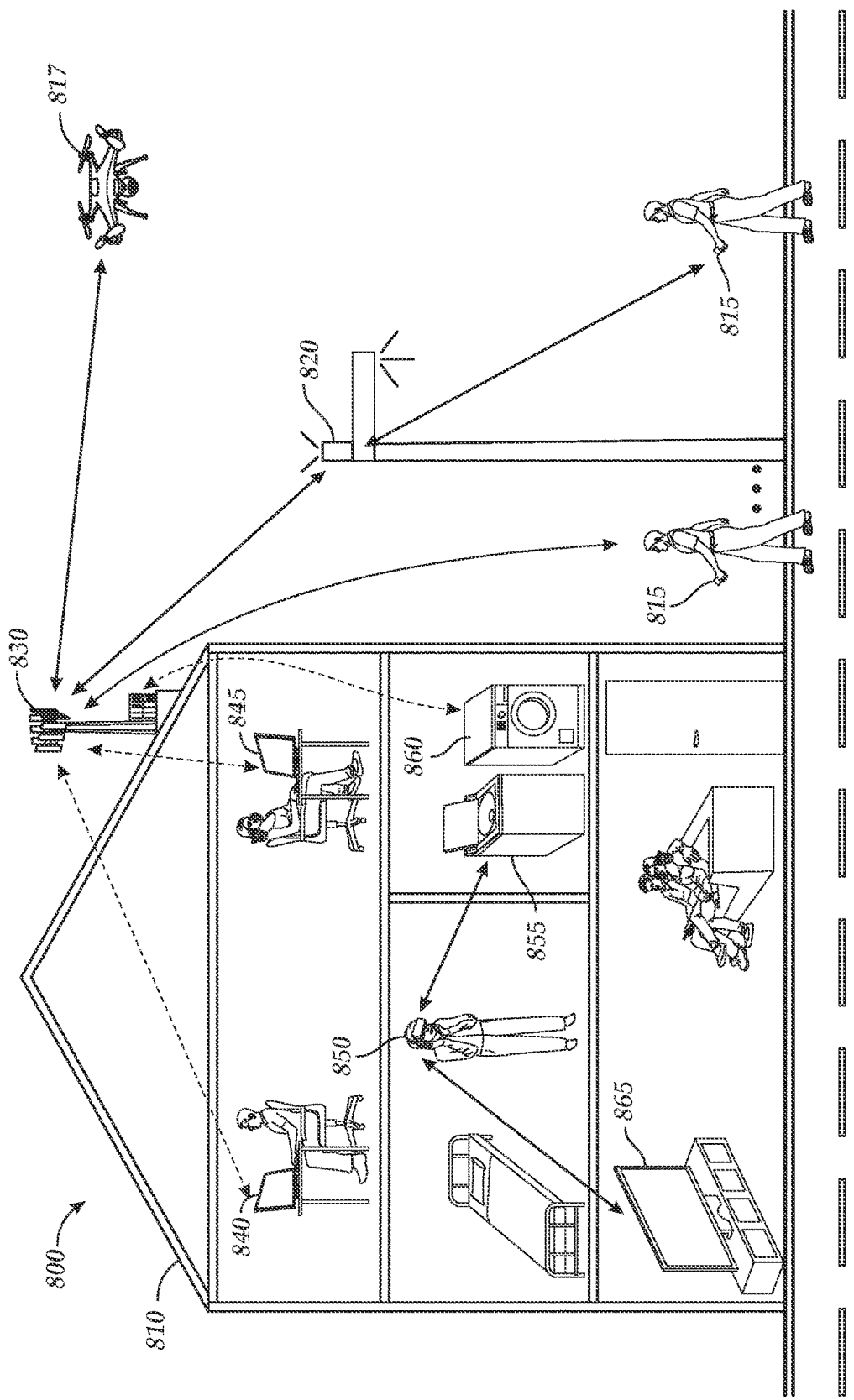
FIG. 8 is a block diagram of a wireless communications system arranged in accordance with aspects of the present disclosure.

FIG. 8 is a block diagram of a wireless communications system 800 in accordance with aspects of the present disclosure. The wireless communications system 800 includes a mobile device 815, a drone 817, a communication device 820, and a small cell 830. A building 810 also includes devices of the wireless communication system 800 that may be configured to communicate with other elements in the building 810 or the small cell 830. The building 810 includes networked workstations 840, 845, virtual reality device 850, IoT devices 855, 860, and networked entertainment device 865. In the depicted system 800, IoT devices 855, 860 may be a washer and dryer, respectively, for residential use, being controlled by the virtual reality device 850. Accordingly, while the user of the virtual reality device 850 may be in different room of the building 810, the user may control an operation of the IoT device 855, such as configuring a washing machine setting. Virtual reality device 850 may also control the networked entertainment device 865. For example, virtual reality device 850 may broadcast a virtual game being played by a user of the virtual reality device 850 onto a display of the networked entertainment device 865.

The small cell 830 or any of the devices of building 810 may be connected to a network that provides access to the Internet and traditional communication links. Like the system 700, the system 800 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 700. System 800 may operate and be configured to communicate analogously to system 700. Accordingly, similarly numbered elements of system 800 and system 700 may be configured in an analogous way, such as communication device 820 to communication device 720, small cell 830 to small cell 730, etc. . . .

Like the system 700, where elements of system 700 are configured to form independent hierarchal or ad-hoc networks, communication device 820 may form a hierarchal network with small cell 830 and mobile device 815, while an additional ad-hoc network may be formed among the small cell 830 network that includes drone 817 and some of the devices of the building 810, such as networked workstations 840, 845 and IoT devices 855, 860.

Devices in communication system 800 may also form (D2D) connections with other mobile devices or other elements of the system 800. For example, the virtual reality device 850 may form a narrowband IoT connections with other devices, including IoT device 855 and networked entertainment device 865. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 850.

In various examples, the elements of wireless communication system 800, such as the mobile device 815, the drone 817, the communication device 820, and the small cell 830, the networked workstations 840, 845, the virtual reality device 850, the IoT devices 855, 860, and the networked entertainment device 865, may be implemented utilizing an autocorrelation calculator as described herein. For example, the communication device 720 may include system 100 in FIG. 1, electronic device 202 in FIG. 2, system 400 in FIG. 4.

In an example, the mobile device 815 may implement the electronic device 202 having an autocorrelation calculator 205 for receiving signals via the antennas 206-210 and calculating autocorrelation matrices as described herein. The signals received may be calibration signals to determine a set of weights for the devices 815, which may be utilized to generate an estimate of the information encoded in additional incoming signals based on the determined set of weights. Advantageously, in determining a set of weights more quickly with the autocorrelation calculation techniques described herein, the mobile device 815 may render information (e.g., video content) more quickly than a mobile device 815 employing a traditional autocorrelation calculation scheme. For example, the mobile device 815, employing an autocorrelation calculator 205, may utilize a lesser amount of memory than an autocorrelation calculation occupying an N×L amount of memory. The mobile device 815 may occupy a memory space related to a number of antennas on the mobile device 815. The mobile device 815 may store an autocorrelation matrix of an L×L size of memory and a vector space representative of the symbols indicative of RF energy received at each respective antenna. The amount of memory occupied in this autocorrelation calculation may be less than that of memory occupied when an autocorrelation is not computed at each time period.

According to an autocorrelation calculation described above where N time periods are received for each L antenna, an autocorrelation matrix, calculated according to traditional autocorrelation calculation scheme, may occupy an N×L amount of memory. Such an autocorrelation calculation may utilize more memory in calculating the autocorrelation than the autocorrelation calculation, described herein, in which each received signal vector in real-time is autocorrelated and added to a stored autocorrelation matrix representative of the autocorrelation at a previous time period relative to a current, real-time, time period of the received signal. Advantageously, the memory available to the mobile device 815 may be efficiently utilized, allowing the mobile device 815 to utilize other memory for additional processing operations, such as queueing video content to be streamed to a user of the mobile device 815.

While described above in the context of some specific examples of the elements of communication system 800, the elements of communication system 800 may be implemented using, for example, system 100 in FIG. 1, electronic device 202 in FIG. 2, system 400 in FIG. 4, or any system or combination of the systems depicted in FIGS. 1-2 and 4-8 described herein Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), Nex Generation Architecture (NexGen), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus comprising:
    a receiver configured to receive a plurality of narrowband Internet of Things (IoT) transmissions from respective transmission devices of a plurality of transmission devices;
    a processor configured to:
        store an autocorrelation matrix representative of an autocorrelation of symbols comprising symbols indicative of a first narrowband IoT transmission of the plurality of narrowband IoT transmissions and symbols indicative of a second narrowband IoT transmission of the plurality of narrowband IoT transmissions, the first and second narrowband IoT transmissions received during a first time period; and
        calculate an updated autocorrelation matrix based partly on the autocorrelation matrix and the autocorrelation of symbols comprising symbols indicative of the first narrowband IoT transmission received during a second time period subsequent to the first time period.

2. The apparatus of claim 1, wherein the narrowband IoT band corresponds to a sub-6 GHz band.

3. The apparatus of claim 1, wherein the plurality of transmission devices are configured to operate on a sub-6 GHz band or on a shared spectrum for unlicensed wireless spectrum uses.

4. The apparatus of claim 1, wherein the plurality of transmission devices comprises one or more of an IoT device, a virtual reality device, a mobile device, a drone, a communication device, or a vehicle device.

5. The apparatus of claim 1, wherein the plurality of transmission devices comprises a sensor device for detecting energy, heat, light, vibration, or biological signals.

6. The apparatus of claim 1, wherein the first narrowband IoT transmission and the second narrowband IoT transmission are within a frequency band having a bandwidth of between 1 MHz and 20 MHz.

7. At least one non-transitory computer-readable storage medium containing programming instructions that, when executed by a processor, cause the processor to:
    store an autocorrelation matrix representative of an autocorrelation of symbols comprising symbols indicative of a first narrowband Internet of Things (IoT) transmission and symbols indicative of a second narrowband IoT transmission, the first and second narrowband IoT transmission received from a wireless channel during a first time period; and
    update the autocorrelation matrix by autocorrelation of symbols comprising symbols indicative of a third narrowband IoT transmission and symbols indicative of a fourth narrowband IoT transmission, the third and fourth narrowband IoT transmission received from the wireless channel during a second time period subsequent to the first time period.

8. The non-transitory computer-readable storage medium of claim 7, wherein the processor is further configured to:
    update the autocorrelation matrix by autocorrelation of symbols comprising symbols indicative of a fifth narrowband IoT transmission and symbols indicative of a sixth narrowband IoT transmission, the fifth and sixth narrowband IoT transmission received from the wireless channel during a third time period subsequent to the second time period.

9. The non-transitory computer-readable storage medium of claim 7, wherein the processor is further coupled to a first receive path and a second receive path, the processor is further configured to:
  receive the first narrowband IoT transmission and the third narrowband IoT transmission at the first receive path associated with a first antenna; and
  receive the second narrowband IoT transmission and the fourth narrowband IoT transmission at the second receive path associated with a second antenna.

10. The non-transitory computer-readable storage medium of claim 7, wherein the symbols indicative of the first, second, third and fourth narrowband IoT transmission are converted from frequency-domain symbols including frequency-domain OFDM symbols.

11. The non-transitory computer-readable storage medium of claim 9, wherein:
  the symbols indicative of the first narrowband IoT transmission and the symbols indicative of the second narrowband IoT transmission form a first vector, in which each component represents a symbol indicative of RF energy received in a portion of a wireless spectrum incident on the first antenna; and
  the symbols indicative of the third narrowband IoT transmission and the symbols indicative of the fourth narrowband IoT transmission form a second vector, in which each component represents a symbol indicative of RF energy received in a portion of a wireless spectrum incident on the second antenna.

12. The non-transitory computer-readable storage medium of claim 7, wherein the programming instructions for execution by the processor are retrieved from a network via an I/O interface, and wherein the processor is configured to store and update the autocorrelation matrix at a plurality of memory cells in a memory device.

13. A method comprising:
  receiving, at a plurality of receive paths, a plurality of first Internet of Things (IOT) transmissions at a first time;
  determining, by a processor, an autocorrelation matrix representative, in part, of an autocorrelation of symbols representing the plurality of first IoT transmissions,
  receiving, at the plurality of receive paths, a plurality of second IoT transmissions at a second time subsequent to the first time; and
  updating, by the processor, the autocorrelation matrix based on an autocorrelation of symbols representing the plurality of second IoT transmissions.

14. The method of claim 13, wherein the first IoT transmissions and the second IoT transmissions are within a frequency band having a bandwidth of between 1 MHz and 20 MHz.

15. The method of claim 13, wherein each of the plurality of receive paths is associated with a respective antenna.

16. The method of claim 13, wherein the plurality of first IoT transmissions and the plurality of second IoT transmissions comprise frequency-domain symbols including OFDM symbols.

17. The method of claim 16 further comprising:
  converting the plurality of first IoT transmissions to time-domain symbols before determining the autocorrelation matrix; and
  converting the plurality of second IoT transmissions to time-domain symbols before updating the autocorrelation matrix.

18. The method of claim 13, wherein updating the autocorrelation matrix comprises adding the autocorrelation matrix by the autocorrelation of symbols representing the plurality of second IoT transmissions.

19. The method of claim 18, wherein each of the plurality of first IoT transmissions and the plurality of second IoT transmissions comprise a respective vector having a size based at least on a number of receive paths in the plurality of receive paths.

20. The method of claim 19, wherein a size of the autocorrelation matrix is based at least on the number of receive paths in the plurality of receive paths.

* * * * *